July 13, 1948.    N. CORDIS    2,445,056
SILO DISCHARGER
Filed Nov. 7, 1945    2 Sheets-Sheet 1
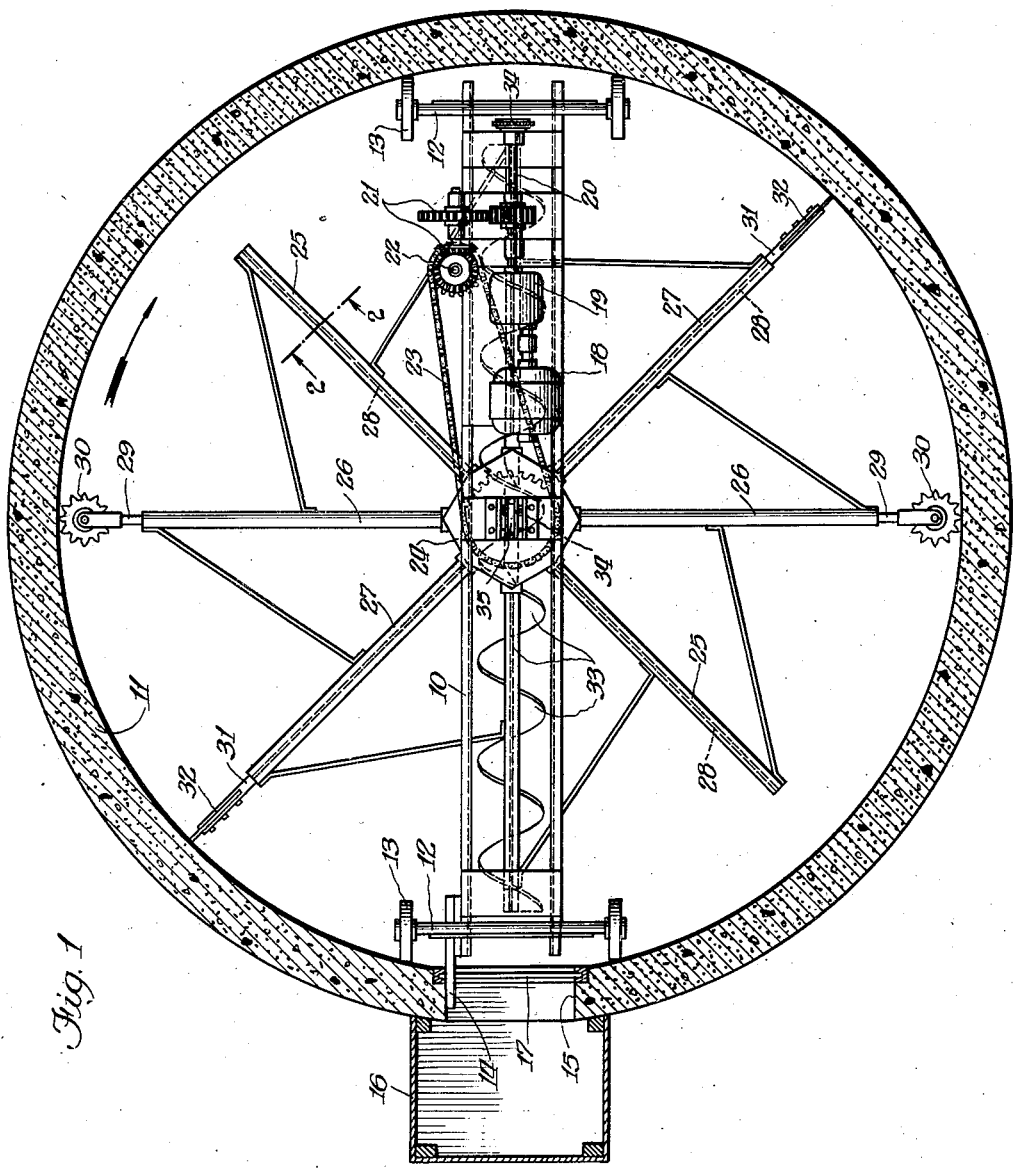
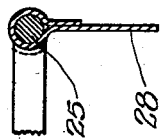
INVENTOR.
Nat Cordis
BY
Brayton Richards
Attorney.

July 13, 1948.    N. CORDIS    2,445,056
SILO DISCHARGER
Filed Nov. 7, 1945    2 Sheets-Sheet 2
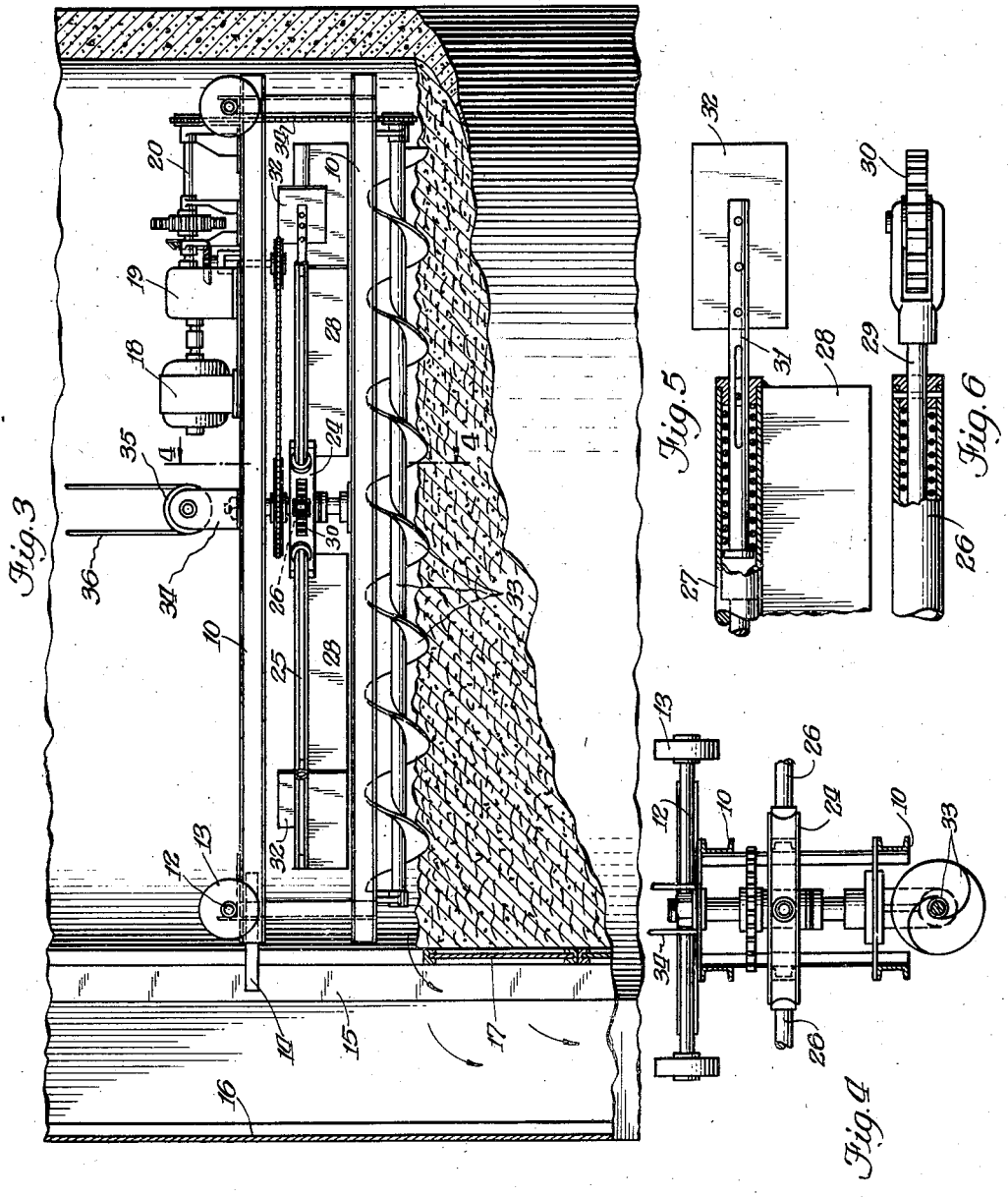
INVENTOR.
Nat Cordis.
BY
Brayton Richards
Attorney.

Patented July 13, 1948

2,445,056

UNITED STATES PATENT OFFICE 2,445,056

SILO DISCHARGER

Nat Cordis, Bassett, Wis.

Application November 7, 1945, Serial No. 627,169

4 Claims. (Cl. 214—17)

The invention relates to improvements in silos and has for its primary object the provision of power operated means for discharging the contents of the silo and refilling the same, which is of simple construction and highly efficient in use.

Other objects will appear hereinafter.

The invention will be best understood by reference to the accompanying drawings forming a part of this specification and in which—

Fig. 1 is a horizontal section of a silo equipped with discharging means embodying the invention;

Fig. 2 a section taken substantially on line 2—2 of Fig. 1;

Fig. 3 a partial transverse section of the silo showing the discharging means in position of use;

Fig. 4 a section taken substantially on line 4—4 of Fig. 3;

Fig. 5 an enlarged detail vertical section through the end of one of the plurality of scraper arms employed in the construction; and Fig. 6 a partial horizontal section of the same.

The embodiment of the invention illustrated in the drawings comprises a suitable rectangular frame 10 of a size and shape to extend loosely across the central portion of the silo 11, said frame being provided at its top at opposite sides with transverse axles 12 and wheels 13 running on the side walls of the silo as shown. The frame 10 is provided with a stop arm 14 extending into the usual discharge opening 15 at one side of the silo and contacting with one wall of said opening to prevent turning or revolving of the frame 10 within the silo. The silo is also equipped with the usual chute 16 to facilitate discharge of material therefrom and the usual removable doors 17, as will be readily understood by those skilled in this art.

An electric motor 18 is arranged on the top of the frame 10 and connected through gear reducing mechanism 19 with a main drive shaft 20, as best shown in Figs. 1 and 3. The drive shaft 20 is connected by suitable gearing 21 with a vertical counter shaft 22 connected by belt 23 with a central revolving scraper head 24, as indicated. The scraper head 24 is provided with a plurality of radial scraper arms 25, 26 and 27, which may conveniently be made of piping and each of which carries a depending scraper plate 28, as indicated. The arms 26 carry telescoping spring held plunger rods 29 carrying revolving cutter wheels 30 at their outer ends equipped with radial projections as shown and adapted and arranged to ride upon the inner walls of the silo and thus break up and loosen any silage clinging thereto. Likewise, the arms 27 are provided with similar spring held plunger rods 31 carrying scraper blades 32 at their outer ends arranged to contact with the inner walls of the silo and thus remove therefrom any silage clinging thereto.

A screw conveyor 33 is arranged as indicated diametrically on the bottom of the frame 10 and is connected by a belt 34 with the drive shaft 20, and whereby the said conveyor will be operated to discharge silage through the side opening 15 of the silo.

In use and in operation, the frame 10, carrying the parts above described, is placed on top of the silage in the silo and the parts thereof operated through the electric motor 18 when it is desired to feed the silage from the silo. The conveyor 33 will dig a transverse trough in the silage, discharging the material therefrom through the side opening 15, the corresponding door 17 thereof having been removed. At the same time, the scraper arms are revolved across the top of the silage, thereby bringing the top layer of silage to the screw conveyor, which will discharge the same as explained above. In this way, a simple and efficient discharging means is provided for the silo which is power driven. The specific form and arrangement of parts disclosed is a specific and effective one for the purpose.

The frame 10 is also equipped with a pulley bracket 34 carrying pulleys 35 for connection with a lifting cable 36 and whereby the said frame may be raised or lowered in the silo when and as desired. In filling the silo, the screw conveyor 33 will be removed from the frame 10 and said frame lowered onto the silage as it is supplied to the silo and the scraper arms 25, 26 and 27 operated to level or even the top surface thereof, thereby avoiding the inclusion of any air pockets as the silo is filled.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. In combination with a silo having a discharge opening at one side thereof; a frame arranged to travel vertically in said silo; a screw conveyor suspended from said frame arranged and adapted to cut a trough in the upper side of a silage body contained therein, and to deliver silage therefrom toward said discharge opening of said silo; revolving radial scraping means arranged above said screw conveyor adapted to contact the uppermost portions of said silage body for movement toward said trough; and means for actuating said screw conveyor and said revolving radial scraping means.

2. The construction specified in claim 1, in which the said frame is arranged above said silage body in horizontal position; and a pair of guide wheels carried at each end of said frame in spaced alignment to facilitate the vertical movement thereof.

3. The construction specified in claim 1, in which the radial scraping means is provided with yieldably held plunger rods carrying at their extremities revolvable cutter wheels at the marginal edge of said silage body.

4. The combination with a silo having a discharge opening at one side thereof; a frame arranged to travel vertically in said silo having a pair of wheels axially mounted at each end thereof, rolling vertically on the inner walls of said silo; revolving scraper means comprising a revolving head having a plurality of radial scraping arms extending therefrom; spring-held yieldable scraper blades at the end of one or more of said scraper arms arranged to contact with the side walls of said silo and remove material clinging thereto; spring-held revolvable cutter wheels having radial projections mounted on the ends of one or more of said scraper arms and contacting the side walls of said silo; and a screw conveyor arranged at the bottom of said frame in diametrical alignment to the side opening of said silo adapted and arranged to move silage outwardly toward the side opening of the silo, substantially as described.

NAT CORDIS.

REFERENCES CITED

The following references are of record in the file of this patent:

UNITED STATES PATENTS

| Number | Name | Date |
| --- | --- | --- |
| 750,241 | Buck | Jan. 19, 1904 |
| 844,693 | Seidel, Jr. | Feb. 19, 1907 |
| 1,068,176 | Scott | July 22, 1913 |
| 1,233,308 | Burgess | July 17, 1917 |
| 1,479,990 | Keys | Jan. 8, 1924 |
| 1,740,250 | Kutz, Sr., et al. | Dec. 17, 1929 |